(12) United States Patent
Usul et al.

(10) Patent No.: US 12,338,939 B2
(45) Date of Patent: Jun. 24, 2025

(54) PIPE OR DUCT PROBE AND SYSTEM COMPRISING PIPE OR DUCT PROBE

(71) Applicant: BODUS GmbH, Aarau (CH)

(72) Inventors: Muarem Usul, Oftringen (CH); Daniel Boller, Wittnau (CH)

(73) Assignee: BODUS GmbH, Aarau (CH)

( * ) Notice: Subject to any disclaimer, the term of this patent is extended or adjusted under 35 U.S.C. 154(b) by 11 days.

(21) Appl. No.: 18/265,035

(22) PCT Filed: Nov. 30, 2021

(86) PCT No.: PCT/EP2021/083497
§ 371 (c)(1),
(2) Date: Jun. 2, 2023

(87) PCT Pub. No.: WO2022/117540
PCT Pub. Date: Jun. 9, 2022

(65) Prior Publication Data
US 2024/0019070 A1    Jan. 18, 2024

(30) Foreign Application Priority Data
Dec. 4, 2020   (EP) .................................... 20211890

(51) Int. Cl.
| | |
|---|---|
| *F16L 55/40* | (2006.01) |
| *A46B 13/00* | (2006.01) |
| *A46B 13/02* | (2006.01) |
| *B08B 9/043* | (2006.01) |
| *B08B 9/047* | (2006.01) |

(Continued)

(52) U.S. Cl.
CPC ............ *F16L 55/40* (2013.01); *A46B 13/001* (2013.01); *A46B 13/02* (2013.01); *B08B 9/043* (2013.01); *B08B 9/0436* (2013.01); *B08B 9/047* (2013.01); *B26D 1/0006* (2013.01); *F16L 55/30* (2013.01);

(Continued)

(58) Field of Classification Search
CPC .................. A46B 13/001; A46B 13/02; A46B 2200/3013; B08B 9/043; B08B 9/0436; B08B 9/047; B08B 2209/04; F16L 55/265; F16L 55/30; F16L 55/40; F16L 2101/10; F16L 2101/12; F16L 2101/16
See application file for complete search history.

(56) References Cited

U.S. PATENT DOCUMENTS

| 5,813,089 A | * | 9/1998 | Nolan | ................ E03F 9/005 239/443 |
|---|---|---|---|---|
| 9,683,360 B1 | | 6/2017 | Vigoa | |

(Continued)

FOREIGN PATENT DOCUMENTS

| CN | 109555933 A | * | 4/2019 | ............. F16L 55/32 |
|---|---|---|---|---|
| CN | 11089219 A | | 5/2020 | |
| EP | 3647648 A1 | | 5/2020 | |

OTHER PUBLICATIONS

CN 109555933 A; Bao et al.; Apr. 2, 2019.*

*Primary Examiner* — Randall E Chin
(74) *Attorney, Agent, or Firm* — Lippes Mathias LLP (57) ABSTRACT

The invention relates to a pipe or duct probe (10) for insertion into a pipe (90) or into a duct. The pipe or duct probe (10) comprises: at least one motor (15), at least one motor shaft (18), at least one working means (30, 30', 30") connected to the motor shaft (18), a connection device (40) for connecting the motor (15) to a cable (75), and at least one centering device (50) connected to a housing (20).

17 Claims, 4 Drawing Sheets

(51) Int. Cl.
   *B26D 1/00* (2006.01)
   *F16L 55/30* (2006.01)
   *F16L 101/12* (2006.01)

(52) U.S. Cl.
   CPC ... *A46B 2200/3013* (2013.01); *B08B 2209/04* (2013.01); *F16L 2101/12* (2013.01)

(56) References Cited

U.S. PATENT DOCUMENTS

| | | | |
|---|---|---|---|
| 11,344,930 B2 * | 5/2022 | Rauckhorst, III | ...... B08B 9/057 |
| 2017/0081834 A1 | 3/2017 | Benedid | |

* cited by examiner

PIPE OR DUCT PROBE AND SYSTEM COMPRISING PIPE OR DUCT PROBE

BACKGROUND

The invention relates to a pipe or duct probe for insertion into a pipe or into a duct. The invention relates in addition to a system comprising a pipe or duct probe.

In sewer technology, such cleaning and coating devices are known which have tools attached to flexible shafts, such as brushes or chain scrapers. The flexible shaft is driven here by an external motor. These motors must be able to apply large torques in order to cope with the friction moments that arise.

The rotation of a flexible shaft of this kind causes vibrations, friction and high torques, which in principle impairs the application of a resin layer and makes the cleaning process more difficult.

In addition, the aforementioned vibrations and frictions as well as the high torques lead to increased wear of the known cleaning and coating equipment.

It is thus an aim of the present invention to provide a further developed pipe or duct probe, with the intention of overcoming the aforementioned disadvantages.

Furthermore, it is an aim of the invention to provide a further developed system comprising a further developed pipe or duct probe.

By means of a further developed system and by means of a further developed pipe or duct probe, it should be easier to carry out a resin coating and a cleaning of a pipe or a duct.

BRIEF DESCRIPTION

According to the invention, the explained aim is addressed with regard to a pipe or duct probe.

Specifically, the aim is addressed by a pipe or duct probe for insertion into a pipe or into a duct, the pipe or duct probe according to the invention comprising
- at least one motor,
- at least one motor shaft,
- at least one working means connected to the motor shaft,
- a connection device for connecting the motor to a cable, and
- at least one centering device connected to a housing.

Thus, according to the invention, such a pipe or duct probe is provided which itself has a motor. A working means is thus driven by a motor which is itself formed as part of a pipe or duct probe.

A pipe or duct probe is understood to be such a component that is inserted into a pipe or duct. Preferably, the complete pipe or duct probe is inserted or insertable in a pipe or in a duct.

Since the motor is formed as part of the pipe or duct probe, it is not necessary to provide a flexible shaft connecting an external motor to a working means. Rather, the motor shaft is driven directly in the pipe or duct.

Only a connection to a cable, especially a power supply cable and/or data cable, is necessary, with the cable being led out of the pipe or out of the duct to the outside. By means of the cable, an electrical connection and/or a data connection of the motor to a power supply unit and/or control unit, which is preferably formed outside the pipe or the duct, is established.

By means of the centering device, it is possible to guide the pipe or duct probe in a pipe or in a duct. By means of a centering device, it is possible to allow uniform coating and/or uniform cleaning of a pipe or a duct. By means of a centering device, the pipe or duct probe can also be guided through curved pipes or ducts.

The pipe or duct probe according to the invention is provided as a device which allows flexible use in a pipe or in a duct due to a compact design as well as appropriate grouping of individual probe components.

The term 'probe', namely a pipe or duct probe, is to be interpreted in such a way that the components and component portions belonging to the probe are inserted into a pipe or into a duct. Components or component portions that remain completely outside the pipe or the duct are not to be included as part of the pipe or duct probe. Such components or component portions are components of a system according to the invention, which comprises a pipe or duct probe according to the invention.

Due to the design of the pipe or duct probe according to the invention, a good bendability is achieved.

The motor of the pipe or duct probe is preferably a direct current (DC) motor. It is possible to use direct current motors that can be operated in speed ranges of 0-2,000 rpm.

Especially, a connection via a cable to a power supply providing a 50 Hz power supply is possible. By means of miniaturised direct current motors, a motor power of up to 200 W is possible. By means of the motor of the pipe or duct probe, a continuous torque of up to 250 mNm can be provided.

The pipe or duct probe according to the invention has a centering device which is connected to a housing. The housing may be a housing of the pipe or duct probe. Furthermore, it is possible that the housing is a housing or a housing portion of the motor.

Preferably, the motor is positioned together with a motor housing in a housing or a housing portion of the pipe or duct probe. In other words, a motor housing may be at least partially surrounded by a housing or a housing portion of the pipe or duct probe.

The centering device, at least in part, can be formed by a plurality of resilient elements or can comprise a plurality of resilient elements.

Preferably, the resilient elements are spaced apart in the circumferential direction of the housing. Especially preferably, the resilient elements are evenly spaced in the circumferential direction of the housing.

Due to the design of resilient elements, it is possible to compensate for irregularities in pipe or duct diameters. Furthermore, bend portions in pipes and/or ducts can be better navigated. The resilient elements of a centering device preferably serve to adapt the centering device to different diameters in pipes and/or ducts.

It is possible that the resilient elements are formed as brush elements or as leg springs or as shaped springs or as tension springs or as resilient pressure pieces.

If the resilient elements are formed as brush elements, they are preferably made of plastic, especially nylon. The advantage of the forming of such brush elements is that forces acting on the pipe or duct probe are cushioned. Furthermore, the motor shaft is less stressed. Forming brush elements as resilient elements also has the advantage of absorbing vibrations. Furthermore, such a brush serves as an anti-twist device.

A leg spring is preferably a 90° leg spring. This means that the leg spring has a shape that is bent through 90°. When the pipe or duct probe is inserted into the pipe and/or the duct, the leg springs are compressed and pressed in the direction of the centre axis of the pipe or duct probe. The pipe or duct probe is centred as a result. When the pressure on the leg spring is reduced, the leg springs can be moved to an original position or in the direction of the original position of the leg spring. The advantage of such leg springs is that they are cheap to manufacture and can be used for different pipe and/or duct diameters.

A shaped spring can be made of spring steel sheet, for example. A shaped spring provides the necessary contact pressure against a pipe and/or duct wall as soon as the pipe or duct probe is guided in a pipe and/or in a duct. The shaped spring can be of a variably constructed form and can be adjusted to the relevant application. Such a form of a resilient element also has the advantage that such a shaped spring can adapt to different pipe dimensions.

A tension spring is preferably two joints that are connected to each other with a tension spring. If a tension spring or a pipe and/or duct probe is located in a pipe and/or duct, the joints are related to each other so that a contact pressure is generated against the pipe and/or duct wall. Thus, the pipe or duct probe is centred in the pipe and/or in the duct. Forming such a tension spring or such tension springs as a centering device has the advantage that such resilient elements can be used in conjunction with different pipe and/or duct diameters.

When forming resilient pressure pieces, these can be formed especially as resilient balls.

Resilient balls are to be understood especially to mean such balls which are mounted in a shell-like receptacle, the balls being resiliently mounted so that the balls can be pressed in the direction of the shell if the balls are subjected to appropriate pressure. Such resilient balls can thus be pressed inwards, i.e. towards the centre axis of the pipe or duct probe, when an inner diameter of a pipe and/or duct is reduced. The outer diameter of the centering device can thus be reduced by pressing the resilient balls in towards the centre axis of the pipe or duct probe.

If the inner diameter of a pipe and/or a duct is increased again, the pre-tensioned balls can be relaxed again so that the balls in the bearing shells are pressed outwards. The outer diameter of the centering device increases again in this case.

Furthermore, it is possible that the resilient elements are formed in a manner similar to turbine blades.

Resilient elements formed in a manner similar to turbine blades are understood to mean such elements which are bent. Preferably, all resilient elements in such an embodiment of the invention have the same bending radius in a depressurised state, the resilient elements preferably being formed from such a material so that the bending radius of the resilient elements that are formed in a manner similar to turbine blades are adapted in dependence on the inner diameter of the pipe and/or the duct.

Depending on the inner diameter of the pipe and/or the duct, the resilient elements formed in a manner similar to turbine blades can be pressed more strongly in the direction of the centre axis of the pipe or duct probe, so that the resilient elements formed in a manner similar to turbine blades have a smaller outer diameter overall. As long as there is no more pressure or a reduced pressure acting on the resilient elements formed in a manner similar to turbine blades, the resilient elements can be moved outwards, i.e. away from the centre axis of the pipe or duct probe, due to the relaxation. In other words, the resilient elements can be returned to an initial position due to a restoring force after a corresponding pressure on the resilient elements has been reduced, the initial position causing a larger outer diameter of all the resilient elements or the centering device.

In a further embodiment of the invention, it is possible that the resilient elements are arranged on a centering device base. The centering device base can be formed as a component or portion of the centering device.

Preferably, the centering device base is annular. Especially, the centering device base can be formed as such a ring which is pushed onto the housing of the pipe or duct probe or forms at least a portion of the housing of the pipe or duct probe. Furthermore, it is possible that the motor (optionally with a motor housing) is located or positioned in an annular centering device base.

In a further embodiment of the invention, the centering device can have bent arms. The bent arms are preferably bent in the same direction. The bent arms are preferably flexible in such a way that the outer diameter of the centering device formed by the bent arms can be increased or decreased depending on the position of the bent arms.

The working means of the pipe or duct probe can be, for example, an application device. For example, the working means can be an application brush. With the aid of such an application device, especially with the aid of an application brush, it is possible to apply an agent, especially a resin-hardener mixture, evenly to the inside of a pipe and/or duct, or to the inside of a reinforcement or repair hose (liner). With the aid of an application device, especially with the aid of an application brush, a resin-hardener mixture can be applied especially evenly. This is due to the fact that the working means is directly or indirectly connected to the motor shaft of the motor and is thus rotated.

Furthermore, it is possible that the working means is a cleaning device. With the aid of such cleaning devices, contaminants in a pipe and/or a duct can be removed. The cleaning device can be a brush head and/or an abrasive paper arrangement and/or a chain scraper and/or a blade drill and/or a paddle blade drill and/or a cutting head and/or a milling head.

The working means can be directly connected to the motor shaft. Furthermore, it is possible that the working means is indirectly connected to the motor shaft.

An indirect connection to the motor shaft is possible, for example, by means of a joint, especially a ball joint. Such a ball joint can be formed between the motor shaft and the working means.

Another possibility regarding an indirect connection of a working means with the motor shaft concerns the indirect connection by means of a spring. Preferably, such a spring is a metal spring that is sufficiently long so that the pipe or duct probe together with the attached working means can also be guided through curved pipe or duct portions. The spring is preferably a spiral spring.

Especially, the means for indirectly connecting the working means to the motor shaft can be formed in such a way that the working means can be easily interchanged. This makes it possible to use the pipe or duct probe with different working means. The means for indirectly connecting the working means to the motor shaft can be formed as a quick connector.

One possibility with regard to forming a centering device base, especially an annular centering device base, is that the centering device base can be interchangeably attached to the pipe or duct probe. Especially, the centering device base can be interchangeably formed on the housing.

It is possible that the shape, especially the diameter, of the centering device base can be adapted to the particular diameter of the pipe or duct to be processed. For this purpose, a plurality of centering device bases can be provided in a set, so that, with regard to different inner diameters of pipes or ducts, an adaptation is possible with regard to the measurements or dimension of the centering device, especially the centering base.

The connection device for connecting the motor to a cable can be, for example, a plug connector or a joint or a spiral spring with attachment piece. If a joint is formed, it may especially be a ball joint. The formation of a connection device is especially necessary or advantageous if the cable to be connected to the pipe or duct probe is a push cable.

If the connection device is formed as a spiral spring, the advantage is that the cable can be protected and the connection device is very flexible. The advantage of forming a joint, especially a ball joint, is that such a joint can be moved almost freely. Furthermore, in such an embodiment of the invention, a connection device is extremely stable.

It is possible that the pipe or duct probe has a temperature sensor. By means of such a temperature sensor, for example, the degree of cross-linking of an applied resin-hardener mixture can be detected.

Furthermore, it is possible that the pipe or duct probe has a camera. With the help of such a camera, it is possible to inspect the pipe or the duct for any degree of contamination. It is also possible to check the result of a coating process by means of a camera.

The pipe or duct probe can further comprise a mixer, especially a static mixer. This mixer, especially the static mixer, can preferably be attached to the centering device. Such a mixer or static mixer is used especially for mixing a resin with a hardener. The resin is mixed with the hardener preferably shortly before the application of the mixture to the pipe, so that the mixing takes place in the structural environment of the pipe or duct probe and not outside the pipe or duct.

Due to the design of the pipe or duct probe according to the invention, it is possible to dispense with two disadvantageous components or elements of known cleaning and coating devices. These components are, on the one hand, the flexible shaft or drive shaft. On the other hand, a large alternating current motor has been necessary up to now. Due to the compact design of the pipe or duct probe according to the invention, it is possible for the first time to carry out both a cleaning process and a coating process with such a device, which can be operated without using a large alternating current (AC) motor.

The direct current motor to be used preferably has a maximum short-time torque of 245 mNm.

It is possible that, in order to seal the motor, the motor shaft and/or the housing of the motor and/or the housing of the pipe or duct probe is sealed by means of a seal, especially by means of a ring seal, especially preferably by means of a shaft ring seal. This prevents an agent that is to be applied, especially a resin-hardener mixture that is to be applied in the pipe, from penetrating into the pipe or duct probe or into the motor.

A shaft ring seal is especially eonomical to manufacture and can be placed and installed in the pipe or duct probe in a space-saving way.

The shaft seal is preferably formed between the motor shaft and the housing. The seal, especially the shaft ring seal, is designed and mounted in the housing in such a way that the seal, especially the shaft ring seal, can be replaced as easily as possible.

In a further embodiment of the invention, the pipe or duct probe can comprise a temperature control unit. With the aid of the temperature control unit, the temperature in the pipe or duct probe can be controlled so that the properties, especially the viscosity, of an agent to be applied, especially of a resin-hardener mixture to be applied, can be adjusted.

The housing is substantially capsule-shaped. The capsule shape is formed, for example, by a sealing cover (or a sealing cap), a cylindrical portion and a cable connection. The sealing cover (sealing cap) serves especially to be able to arrange a shaft ring seal interchangeably in the housing.

Insofar as the resilient elements are formed in a manner similar to turbine blades, the resilient elements are preferably not formed to be constant in terms of width over the longitudinal extent. Rather, such a form of the resilient elements formed in a manner similar to turbine blades which form a convex shape in a side view is provided.

Preferably, the centering device has such a recess, especially an opening, so that a mixer, especially a static mixer, can be fixed to the centering device, especially fixed in a clamping manner.

Another aspect of the invention relates to a system comprising a pipe or duct probe according to the invention and a cable. The cable is especially a push cable. Furthermore, the system comprises a reel in which the cable, especially the push cable, is stored.

Furthermore, the system preferably comprises a control unit and/or a power supply unit, which is/are preferably arranged in or on a housing of the reel.

By means of the system according to the invention, fundamentally the same advantages are achievable as those indicated in conjunction with the pipe or duct probe according to the invention.

BRIEF DESCRIPTION OF THE DRAWINGS

The invention is explained in greater detail below with reference to the accompanying drawings.

In the drawings.

DETAILED DESCRIPTION

In the following, the same reference numerals are used for like and similarly acting parts.

FIGS. 1a-1c and FIG. 2 show the basic structure of a possible embodiment of a pipe or duct probe 10. The pipe or duct probe 10 can include a temperature sensor or camera 12.

Figure 1A:
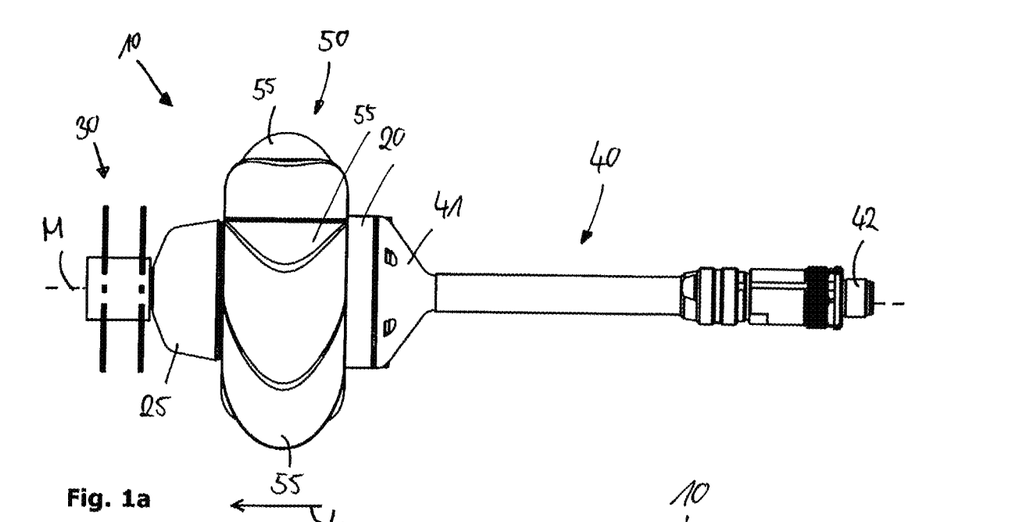
FIG. 1a-1c show different illustrations with regard to a possible embodiment of a pipe or duct probe according to the invention.
Figure 1B:
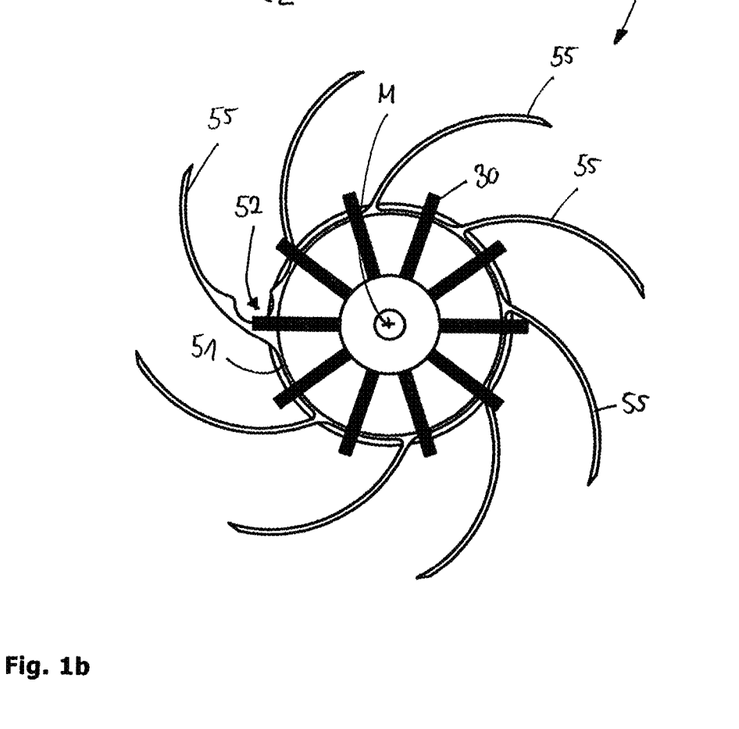
Figure 1C:
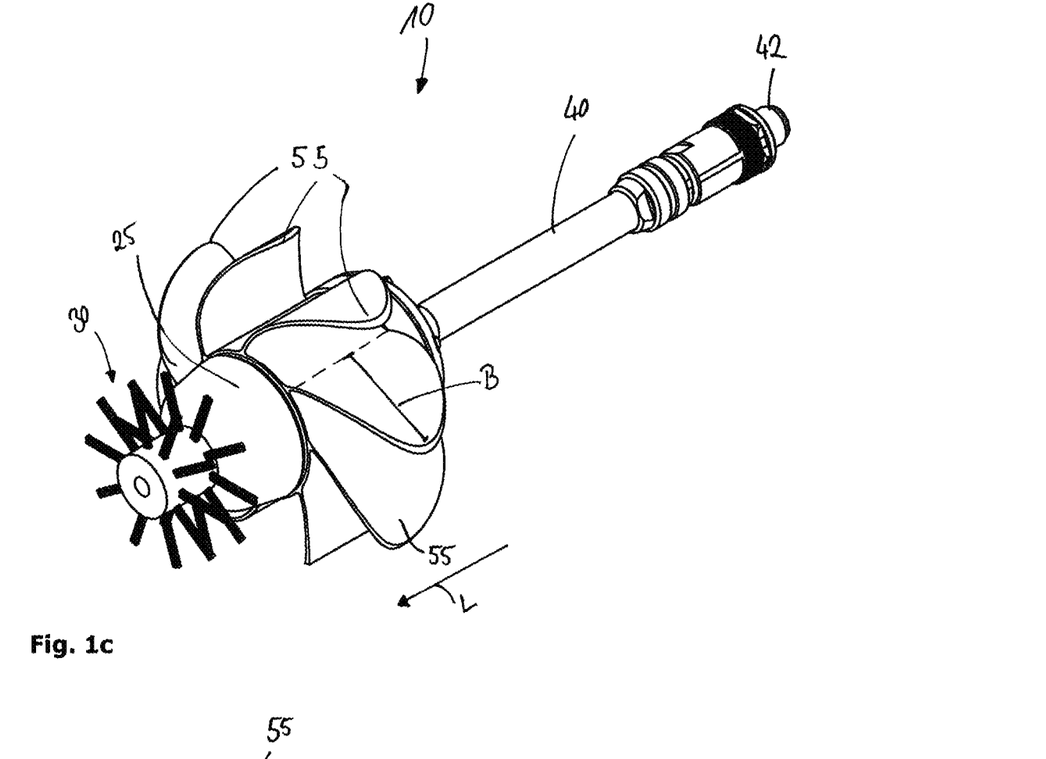
Figure 2:
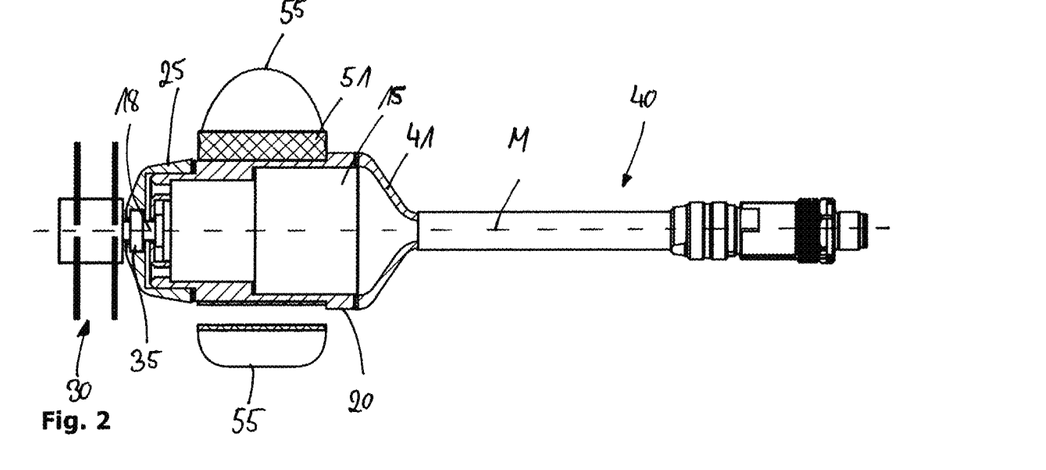
FIG. 2 shows a longitudinal sectional view through the pipe or duct probe according to the invention as shown in FIGS. 1a-1c.

FIG. 1a shows a side view of the pipe or duct probe. FIG. 1b shows a front view of the pipe or duct probe. FIG. 1c shows a perspective view of the pipe or duct probe 10 according to the invention. FIG. 2 shows a longitudinal sectional view through the pipe or duct probe according to the invention as shown in FIGS. 1a-1c.

The pipe or duct probe 10 has a motor 15 (see FIG. 2). The motor 15 itself has a motor housing and is located in a housing 20. In other words, the motor 15 is mounted in the housing 20.

The motor 15 is a direct current motor. The provision of a separate alternating current motor is no longer necessary due to the design of the pipe or duct probe 10 according to the invention.

The motor 15 also has a motor shaft 18 (see FIG. 2). A working means 30 is directly connected to the motor shaft 18.

Furthermore, a connection device 40 is shown.

The connection device 40 is used to connect the motor 15 to a cable (not shown here). A part of the connection device 40, especially the cap-shaped part 41 of the connection device 40, can form part of the capsule-shaped housing 20. The other end of the connection device 40 is used to connect to the indicated cable by means of an attachment piece 42.

A centering device base 51 of a centering device 50 is formed on the housing 20 or partially surrounding the housing 20. The centering device base 51 is formed as an annular portion. A plurality of resilient elements 55 are formed on the centering device base 51. The resilient elements 55 are evenly spaced apart from each other in the circumferential direction of the housing 20, as shown in FIG. 1b.

The centering device base 51 may be interchangeably arranged on the housing 20. It is possible that different centering devices 50 can be mounted on the housing 20. Thus, it is possible that different centering devices 50 can be slid onto the housing 20 and connected to the housing 20 depending on the inner diameter of the pipe or duct.

Eight resilient elements 55 (see FIG. 1b) are formed, which are formed in a manner similar to turbine blades. The elements 55 are preferably made of a plastic material so that the bending radius of the resilient elements 55 can be reduced or increased. When the pipe or duct probe 10 is inserted into a pipe, the resilient elements 55 can be bent in the direction of the centre axis M so that the outer diameter of the centering device 50 can be reduced.

The resilient elements 55 do not have a constant width B in the direction of the longitudinal extent L. Rather, the resilient element 55 is formed in such a way that a kind of convex surface is formed. On the one hand, this enables good centering of the pipe or duct probe 10 in a pipe, and on the other hand, good bendability.

The housing 20 has a sealing cover or sealing cap 25. This sealing cap 25 is formed in the region of the motor shaft 18. A seal 35 is formed in the sealing cap 25. By means of the seal 35, it is prevented that an agent, especially a resin-hardener mixture or other liquids, can penetrate into the motor 15.

The seal 35 is formed in the present case as a shaft ring seal. By means of a shaft ring seal, the penetration of liquid into the housing 20, especially into the motor 15, can be demonstrably prevented.

Preferably, the sealing cap 25 is attached to the rest of the housing 20 in such a way that the seal 35 can be renewed or replaced. For example, the sealing cap 25 is screwed onto another portion of the housing 20.

The working means 30 shown is an application device, namely an application brush. With the aid of such an application brush, an agent, especially a resin-hardener mixture, can be evenly applied to a pipe, especially to a liner located in a pipe.

The working means 30 shown, or the application brush, is directly connected to the motor shaft 18. It is possible that a working means, for example the application brush, is also indirectly connected to the motor shaft 18. Springs, especially spiral springs, are especially suitable for this.

FIG. 1b also shows a recess 52. This recess 52 is used for attaching, especially for clamping, a static mixer (see FIG. 3).

Figure 3:
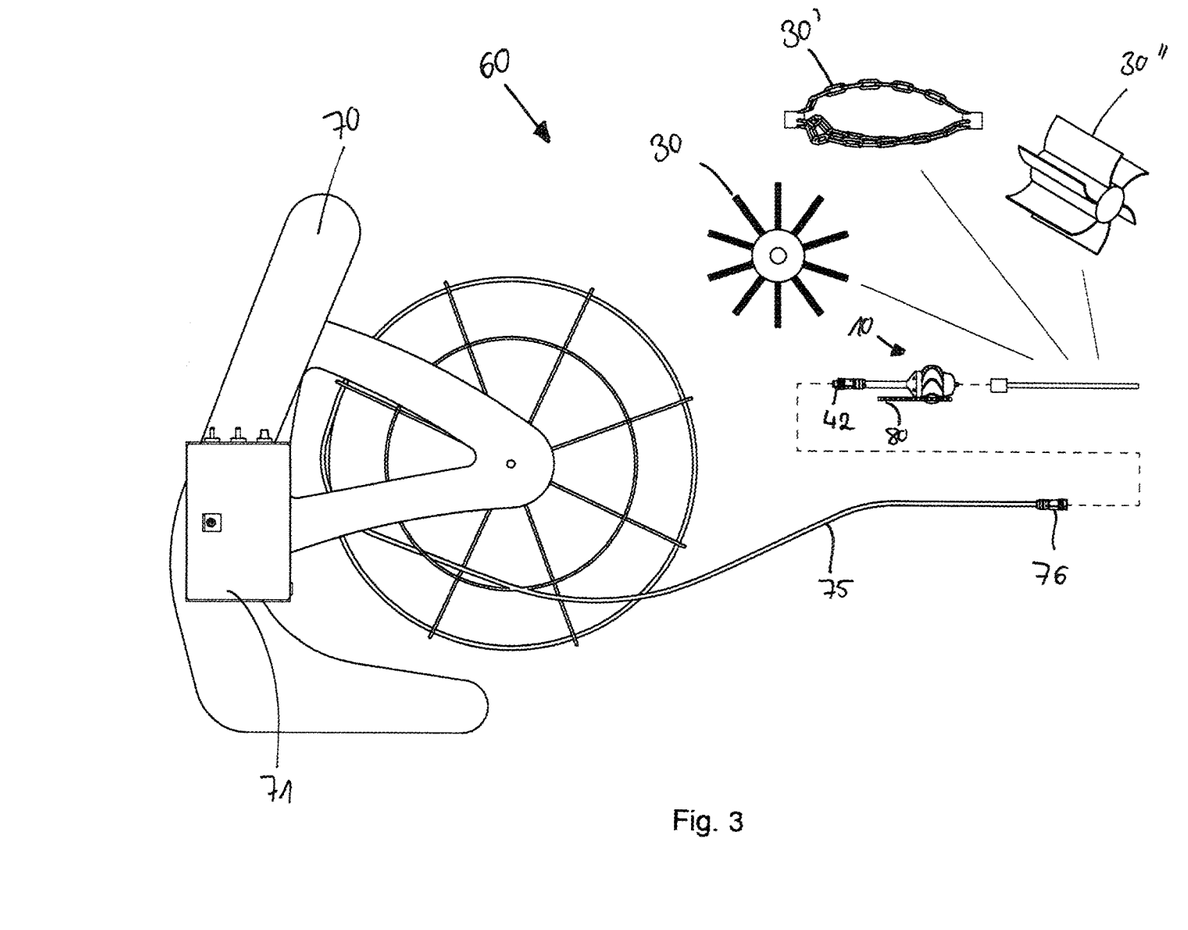
FIG. 3 shows a system according to the invention with representation of possible working means.

FIG. 3 shows a system 60 according to the invention. The system 60 has a pipe or duct probe 10 according to the invention. Furthermore, a reel 70 is shown. The reel 70 serves to support the cable 75 or the push cable. The system 60 further comprises a control unit 71. By means of this control unit 71, the motor of the pipe or duct probe 10 can be controlled accordingly.

Also visible is a static mixer 80, which is connected to the centering device 50 of the pipe or duct probe 10. Accordingly, with the aid of the centering device 50, the static mixer 80 can be moved or transported exactly to a position in a pipe to be treated or coated.

The cable 75 is connected to the pipe or duct probe 10 by means of the connection device 40. An attachment piece 76 of the cable 75 is connected to the attachment piece 42 of the connection device 40. The two attachment pieces 42 and 76 form a kind of quick connector.

FIG. 3 shows alternative embodiments with regard to the working means 30. The working means 30 is an application brush.

The working means 30' is a cleaning device, namely a chain scraper. The working means 30" is also a cleaning device in the form of an abrasive paper assembly.

The working means shown can be variably interchanged, as indicated in FIG. 3. In this respect, direct fastening to the motor shaft 18 or indirect fastening can be provided. The working means 30, 30' and 30" have corresponding fastening devices in this respect.

Figure 4:
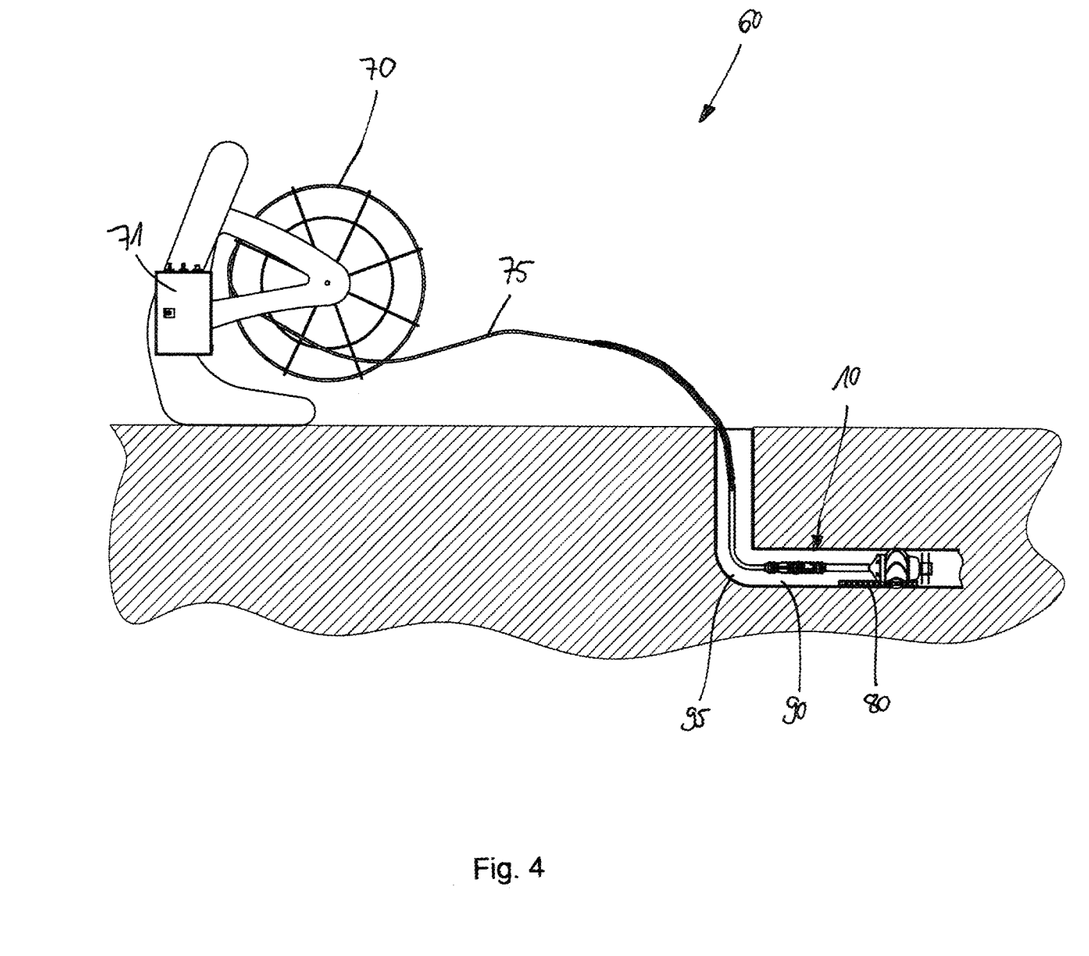
FIG. 4 shows an illustration of the system according to the invention with a pipe or duct probe according to the invention inserted in a pipe.

FIG. 4 also shows the system 60 according to the invention. From this illustration, it is clear which components of the system are actually formed as belonging to the pipe or duct probe 10. The cable 75 is preferably not to be described as belonging to the system 60. This is because the cable 75 is not completely inside the pipe 90.

It can be seen that, due to the design of the pipe or duct probe 10 according to the invention, a transport in the pipe 90 is possible which, among other things, also comprises 90° bend portions 95.

Lastly, it should be noted that all features mentioned in the application documents and especially in the dependent claims, despite the formal reference back to one or more specific claims, are also intended to have independent protection individually or in any combination.

REFERENCE SIGNS 10 pipe or duct probe
15 motor
18 motor shaft
20 housing
25 sealing cap
30, 30', 30" working means
35 seal
40 connection device
41 cap-shaped part
42 attachment piece
50 centering device
51 centering device base
55 resilient element
60 system
70 reel
71 control unit
75 cable
76 attachment piece 80 static mixer
90 duct
95 bend portion
M centre axis
L longitudinal extent
B width

The invention claimed is:

1. A pipe or duct probe (10) for insertion into a pipe (90) or into a duct,
characterised in that
the pipe or duct probe (10) comprises
  at least one motor (15),
  at least one motor shaft (18),
  at least one working means (30, 30', 30") connected to the motor shaft (18),
  a connection device (40) for connecting the motor (15) to a cable (75),
  at least one housing (20), and
  at least one centering device (50) connected to the housing (20), wherein the at least one motor (15) is mounted in the housing (20) and is a direct current motor, and the centering device (50) is formed by a plurality of resilient elements (55), which are spaced apart in a circumferential direction of the at least one housing (20), wherein the resilient elements (55) are in a form of turbine blades.

2. The pipe or duct probe (10) according to claim 1, characterised in that
the resilient elements (55) are mounted on a centering device base (51).

3. The pipe or duct probe (10) according to claim 1, characterised in that
the at least one centering device (50) has bent arms.

4. The pipe or duct probe (10) according to claim 1, characterised in that
the working means (30) is an application device.

5. The pipe or duct probe (10) according to claim 4, characterised in that, the working means (30) is an application brush.

6. The pipe or duct probe (10) according to claim 1, characterised in that
the working means (30', 30") is a cleaning device.

7. The pipe or duct probe (10) according to claim 1, characterised in that
the working means (30, 30', 30") is directly connected to the motor shaft (18) or is indirectly connected to the motor shaft (18) by means of a joint or by means of a spring.

8. The pipe or duct probe (10) according to claim 1, characterised in that
the connection device (40) is formed as a plug connector or as a spiral spring with attachment piece or as a joint.

9. The pipe or duct probe (10) according to claim 1, including
a temperature sensor and/or a camera (12).

10. The pipe or duct probe (10) according to claim 1, characterised by
a static mixer (80).

11. The pipe or duct probe (10) according to claim 10, characterised in that, the static mixer (80) is attached to the centering device (50).

12. The pipe or duct probe (10) according to claim 1, characterised in that the centering device base (51) is annular.

13. The pipe or duct probe (10) according to claim 1, characterised in that, the working means (30', 30") is a brush head and/or an abrasive paper arrangement and/or a chain scraper and/or a blade drill and/or a paddle blade drill and/or a cutting head and/or a milling head.

14. The pipe or duct probe (10) according to claim 1, characterized in that the resilient elements (55) are uniformly distributed in the circumferential direction of the at least one housing (20).

15. A system (60) comprising the pipe or duct probe (10) according to claim 1 and a cable (75) attached thereto.

16. The system (60) according to claim 15, characterised by
a reel (70) in which the cable (75) is stored.

17. The system (60) according to claim 15, characterised by
a control unit (71) arranged in or on a housing of the reel (70).

* * * * *